(12) United States Patent
Oljaca et al.

(10) Patent No.: US 11,337,284 B2
(45) Date of Patent: May 17, 2022

(54) CAPACITIVE DROP POWER SUPPLY FOR LIGHTING CONTROL

(71) Applicant: Texas Instruments Incorporated, Dallas, TX (US)

(72) Inventors: Miroslav Oljaca, Allen, TX (US); Gustavo Alonso Martinez, Missouri City, TX (US); Yogesh Ramadass, San Jose, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/245,146

(22) Filed: Apr. 30, 2021

(65) Prior Publication Data

US 2021/0345464 A1 Nov. 4, 2021

Related U.S. Application Data

(60) Provisional application No. 63/018,231, filed on Apr. 30, 2020.

(51) Int. Cl.
*H05B 45/3725* (2020.01)
*H05B 47/19* (2020.01)
*H05B 45/10* (2020.01)

(52) U.S. Cl.
CPC ......... *H05B 45/3725* (2020.01); *H05B 45/10* (2020.01); *H05B 47/19* (2020.01)

(58) Field of Classification Search
CPC ..... H05B 45/3725; H05B 45/10; H05B 47/19
See application file for complete search history.

(56) References Cited

U.S. PATENT DOCUMENTS

| | | | |
|---|---|---|---|
| 2017/0085180 A1* | 3/2017 | Pulici | H02M 3/156 |
| 2019/0207532 A1* | 7/2019 | Ramadass | H02M 1/42 |
| 2020/0059165 A1* | 2/2020 | Xiao | H02M 3/07 |

* cited by examiner

*Primary Examiner* — Minh D A
(74) *Attorney, Agent, or Firm* — Michael A. Davis, Jr.; Charles A. Brill; Frank D. Cimino

(57) ABSTRACT

A circuit includes a capacitor-drop power supply including a series combination of a resistor and a first capacitor. The capacitor-drop power supply includes an output and is adapted to be coupled to a light source. The circuit also includes a second capacitor, a switch, and an active clamp circuit. The second capacitor couples to the output of the capacitor-drop power supply. The switch couples in parallel with the series combination of the resistor and the first capacitor. The switch is configured to cause the light source to illuminate. The active clamp circuit couples to the capacitor-drop power supply. The active clamp circuit has an output coupled to the capacitor-drop power supply. The active clamp circuit is configured to cause current to continuously flow through at least one of the switch or the series combination of resistor and first capacitor regardless of a magnitude of the voltage across the second capacitor.

19 Claims, 9 Drawing Sheets

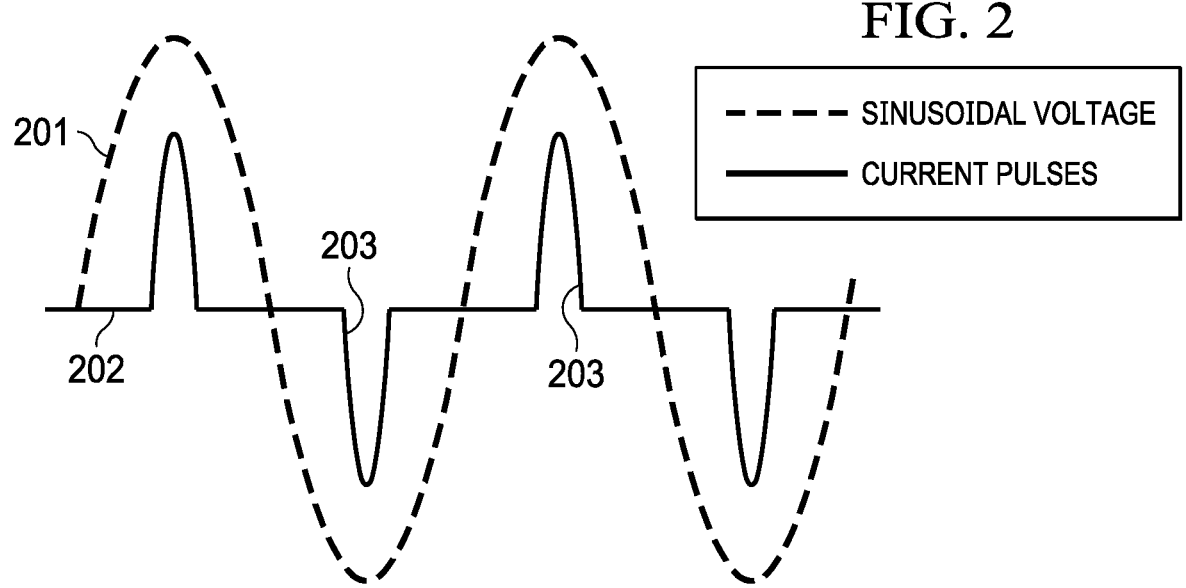
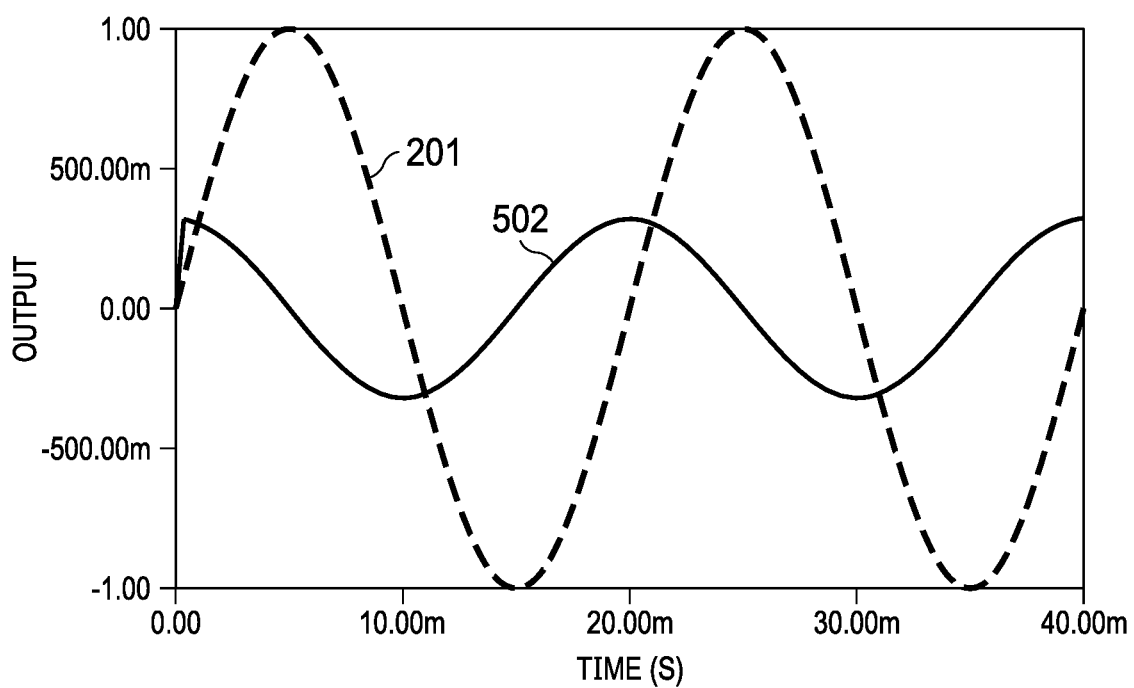

CAPACITIVE DROP POWER SUPPLY FOR LIGHTING CONTROL

CROSS-REFERENCE TO RELATED APPLICATION

This application claims priority to U.S. Provisional Application No. 63/018,231, filed Apr. 30, 2020, which is hereby incorporated by reference.

BACKGROUND

Light bulbs implemented as light emitting diodes (LEDs) are becoming increasing more ubiquitous. An LED operates from a direct current (DC) voltage and current. However, the electrical power to a building (e.g., office budding, home, etc.) is an alternating current (AC) voltage and current. An AC-to-DC converter converts the AC voltage a DC voltage of a suitable voltage level to power the LED, A light control module may couple to the LED. The light control module may include a switch to permit the LED to be turned on or off. The AC-to-DC converter may be part of the light control module.

The AC wires often are designated "line" and "neutral," The light control module and its switch may be put in-line with the "line" wire between the AC voltage source and the LED. Such applications are called "neutral-less" configurations because only the line wire is provided to the light control module, not the neutral wire. Without a neutral wire, the light control module does not have a voltage source to power any active electronics it may contain.

SUMMARY

A circuit includes a capacitor-drop power supply including a series combination of a resistor and a first capacitor. The capacitor-drop power supply includes an output and is adapted to be coupled to a light source. The circuit also includes a second capacitor, a switch, and an active clamp circuit. The second capacitor couples to the output of the capacitor-drop power supply. The switch couples in parallel with the series combination of the resistor and the first capacitor. The switch is configured to cause the light source to illuminate. The active clamp circuit couples to the capacitor-drop power supply. The active clamp circuit has an output coupled to the capacitor-drop power supply. The active clamp circuit is configured to cause current to continuously flow through at least one of the switch or the series combination of resistor and first capacitor regardless of a magnitude of the voltage across the second capacitor.

BRIEF DESCRIPTION OF THE DRAWINGS

FIG. 2 includes waveforms that illustrate that the current through the light control module of FIG. 1 is discontinuous.

FIG. 5 includes waveforms showing an example of the current through the light control module of FIG. 3 illustrating that the current is continuous.

DETAILED DESCRIPTION

Figure 1:
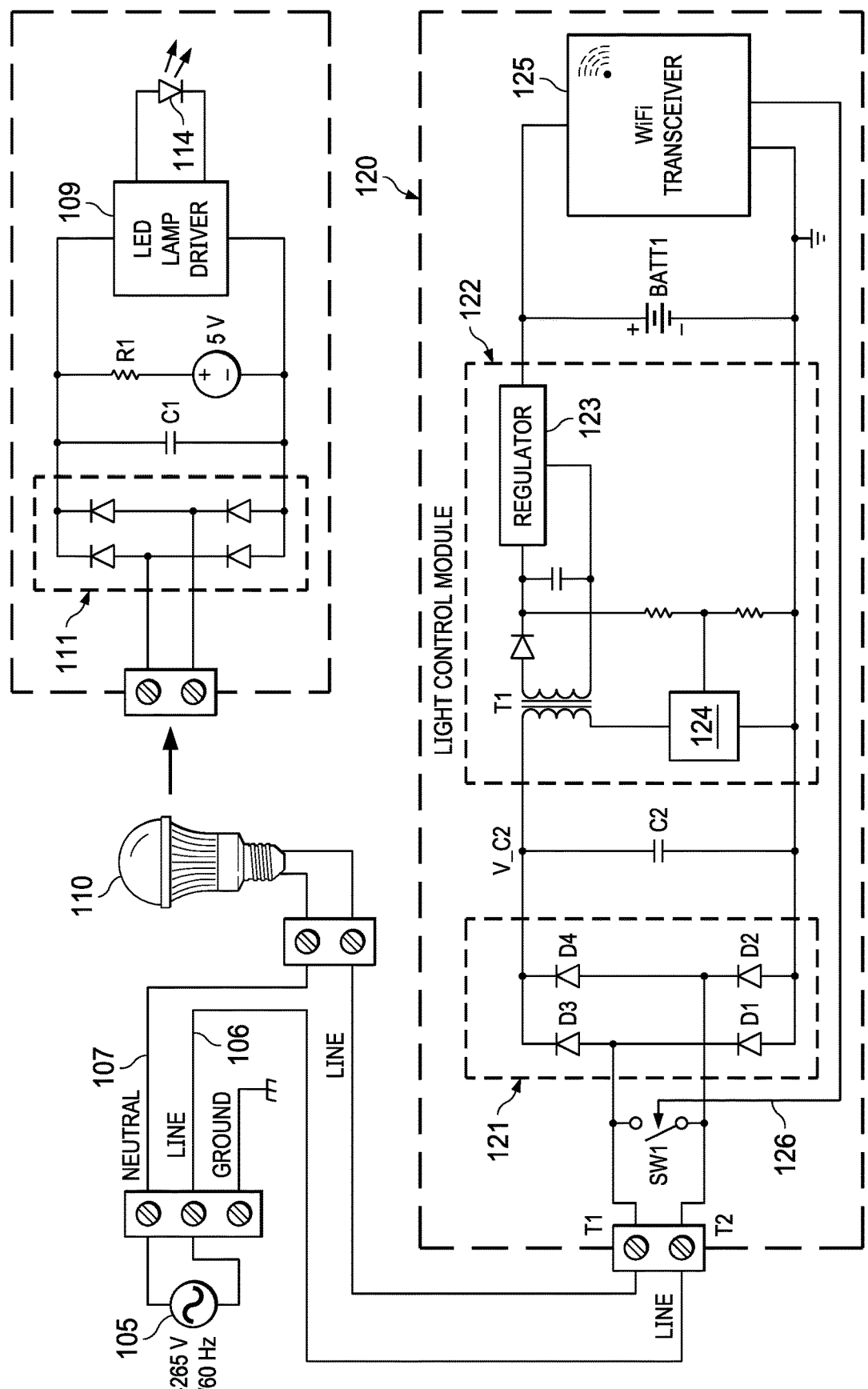
FIG. 1 is a schematic circuit diagram showing an example of a light control module.

In a neutral-less configuration, a light control module implements current stealing, in which a continuous current path through the light control module and the LED has enough current to power active electronics in the light control module, but not enough current to also illuminate the LED. In some power stealing configurations, however, the LED may undesirably flicker on and off as a result of current spikes that are unintentionally created. FIG. 1 shows such an example.

FIG. 1 shows a light source 110 coupled to a light control module 120. The light source 110 may include an LED or other type of light source. An AC voltage source 105 provides power for the light source 110. The AC voltage source 105 includes a line 106 and a neutral 107. In this example, the neutral 107 is coupled to the light source 110, and the line 106 is coupled to terminal T1 of the light control module 120. Terminal T2 of the light control module 120 continues the line 106 to the light source 110. The light control module 120 includes a switch SW1 coupled across terminals T1 and T2. When switch SW1 is closed, a current path is formed thereby causing AC current to flow through the light source 110, and the light source 110 illuminates.

The light control module 120 includes one or more active components that require electrical power for their operation. In the embodiments described herein, the active component includes a WiFi transceiver 125 (and identified by reference numeral 324 in other figures), but can include additional or different active components as well. The WiFi transceiver 125 may receive wireless signals from an external device (such as originating from a smart phone, tablet device, etc.). The wireless signals may include commands to turn the light source 110 on and off. For example, with the light source 110 off, the WiFi transceiver 125 may receive a wireless command to turn on the light source 110. In response, the WiFi transceiver 125 may assert a signal 126 to cause a solid-state switch SW1 to turn on (close). With switch SW1 turned on, a current path for AC current completes through the light source 110 and the light source 110 illuminates. An "off" command can also be wirelessly received by the light control module 120 to cause the light control module 120 to deassert signal 126 to thereby turn off (open) switch SW1 to turn off the light source 110. The WiFi transceiver 125 toggles the on and off states of switch SW1.

FIG. 1 shows an example implementation of the light source 110. In this example, the light source 110 includes one or more LEDs 114, a rectifier 111 (to rectify the AC voltage to the light source to an approximate DC voltage), a capacitor C1, and an LED lamp driver 109. The capacitor C1 is charged to an approximate DC voltage by the rectifier 111. The LED lamp driver 109 receives the capacitor's voltage and converts the voltage to an appropriate level for driving the LED 114.

The light control module 120 also includes a rectifier 121 coupled to a capacitor C2 and to a voltage regulator 122. The rectifier 121 includes diodes D1-D4 in a full bridge rectifier configuration and the rectified output voltage from the rectifier 121 charges capacitor C2. The voltage regulator 122 includes a low drop-out (LDO) regulator 123 and produces a regulated output voltage to power the WiFi transceiver 125 and to charge a battery BATT1. When switch SW1 is on to turn on the light source 110, switch SW1 effectively shorts terminals T1 and T2 together and thus little or no current flows to the rectifier 121 and the voltage regulator 122. For this reason, the battery BATT1 has been included. Battery BATT1 is charged when switch SW1 is open and supplies the operating voltage to the WiFi transceiver 125 when switch SW1 is closed, at least until the point that the battery's charge is depleted. When switch SW1 is open, enough current flows through the rectifier 121 to power the WiFi transceiver 125 and to charge the battery BATT1 through the voltage regulator 122. The current that flows through the rectifier 121 when switch SW1 is open also flows through the light source 110, but the magnitude of the current should not be large enough to cause the light source 110 to illuminate. However, if the charge within battery BATT1 becomes depleted, the output of the voltage regulator 122 directly powers the WiFi transceiver 125 (instead of the battery), and the current from line 106 powers the voltage regulator. Therefore, if the WiFi transceiver were to operate at a sufficiently high power state (e.g., to send and receive numerous wireless packets), the current through line 106 to the light control module 120 may be large enough in each cycle of the AC voltage to momentarily cause the light source 110 to illuminate thereby resulting in a flickering light source.

When switch SW1 is open, the rectifier 121 produces a current to charge capacitor C2. The voltage across capacitor C2 is labeled V_C2. When switch SW1 is open, for current to flow through the rectifier 121 to charge capacitor C2, the instantaneous voltage across terminals T1 and T2 must be larger than the voltage V_C2. Accordingly, during one half-cycle of the AC voltage (when the voltage on neutral 107 is positive relative to line 106), diodes D3 and D2 are on and current flows from terminal T2, through diode D3, through capacitor C2, and back through diode D2 to terminal T1. However, diodes D3 and D2 are on only when the voltage on terminal T2 relative to terminal T1 is more than two diode voltage drops greater than voltage V_C2. During the opposite half-cycle, diodes D1 and D4 are on to provide charge current to capacitor C2 but only when the voltage on terminal T1 relative to terminal T2 is more than two diode voltage drops greater than voltage V_C2.

FIG. 2 shows the approximately sinusoidal AC voltage waveform 201 of line 106 relative to neutral 107. Waveform 202 is the current that flows through the rectifier 121 when switch SW1 is open. As is shown, waveform 202 is characterized by a current pulse 203 during each half-cycle as a result of none of the diodes of the rectifier 121 being on until the AC voltage is large enough (either positive or negative) relative to the voltage V_C2 as described above. The current is not continuous in this example. As described above, it is possible that the WiFi transceiver 125 draws enough current that during each cycle of waveform 202, the current magnitude exceeds a threshold at which the light source 110 illuminates. Accordingly, the light source 110 may flicker if the battery were to become depleted and the WiFi transceiver 125 were to draw too much current.

Figure 3:
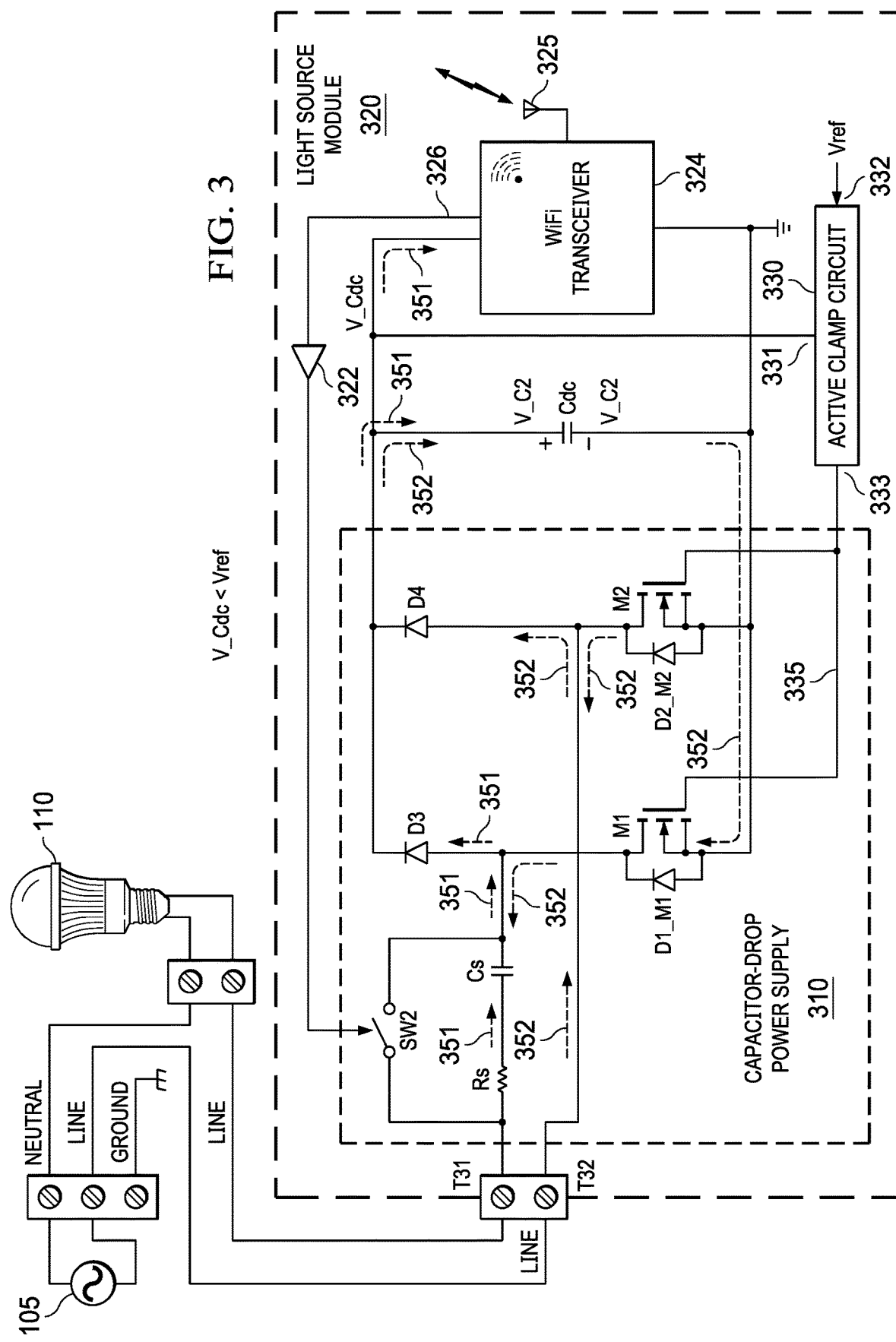
FIG. 3 is a schematic circuit diagram showing a second example of a light control module in which the current is continuous.

FIG. 3 shows an example embodiment of a light control module 320 that includes a capacitor-drop power supply containing one or more capacitors that, in part, function to limit the current magnitude to a low enough level to avoid the flickering problem described above. Light control module 320 includes a capacitor-drop power supply 310, a capacitor Cdc, a WiFi transceiver 324, a driver 322, and an active clamp circuit (ACC) 330. The capacitor-drop power supply 310 includes a resistor Rs coupled to a capacitor Cs. The capacitor-drop power supply 310 uses the capacitive reactance of capacitor Cs to reduce the voltage of the AC voltage source 105 (e.g., 110 VAC, 220 VAC, etc.) to a lower voltage. One terminal of resistor Rs is coupled to terminal T31 of the light control module 320, and the other terminal of resistor Rs is coupled to capacitor Cs. Resistor Rs and capacitor Cs are coupled in series. Capacitor Cs is coupled to an anode of diode D3. The anode of diode D4 is coupled to terminal T32 of the light control module 320. The cathodes of diodes D3 and D4 are coupled together and to one terminal of capacitor Cdc.

Whereas the embodiment of FIG. 1 included diodes D1 and D2 to complete a full bridge rectifier including diodes D1-D4, the light control module embodiment of FIG. 3 has transistors M1 and M2 instead of diodes D1 and D2. In this example, transistors M1 and M2 are metal-oxide semiconductor field-effect transistors (MOSFETs) which include parasitic body diodes. Transistor M1 includes a body diode D1_M1 and transistor M2 includes a body diode D2_M2. In the example of FIG. 3, transistors M1 and M2 are N-type MOSFETs. When transistors M1 and M2 are off, their respective body diodes D1_M1 and D2_M2, combined with diodes D3 and D4 function as a full-bridge rectifier. However, when M1 and M2 are on, as described below, a current path is formed through the channels of the transistors and the full-bridge rectifier functionality is lost in favor of a continued current path to avoid the discontinuous current waveform with current pulses 203 as characterized by the embodiment of FIG. 1. When the charge on capacitor Cdc becomes depleted, a continuous flow of current is available to recharge the capacitor Cdc without the charge current being so high as to cause the light source to illuminate.

The charge on capacitor Cdc provides the voltage source (voltage V_Cdc) for the WiFi transceiver 324 (which includes an antenna 325). The current from line 106 through resistor Rs and capacitor Cs charges capacitor Cdc, and does not flow directly to the WiFi transceiver 125. Capacitor Cs limits the magnitude of the current from line 106 to a low enough level so as not to cause the light source 110 to illuminate while being sufficiently large to charge capacitor Cdc.

The active clamp circuit 330 has inputs 331 and 332 and an output 333. Input 331 is coupled to the upper terminal of capacitor Cdc and thus receives the voltage V_Cdc. Input 332 is coupled to a reference voltage source, Vref. The output 333 is coupled to the control inputs (gates) of transistors M1 and M2. The active clamp circuit 330 includes a comparator (as is described below) which compares voltages V_Cdc and Vref. Voltage Vref is set to a voltage level which generally corresponds to a voltage level for V_Cdc that is sufficiently high to adequately power the WiFi transceiver 324. The active clamp circuit 330 generates an output signal 335 on its output 333 that is high enough to turn on turn on transistors M1 and M2 responsive to voltage V_Cdc being higher than voltage Vref and low enough to turn off transistors M1 and M2 responsive to voltage V_Cdc being lower than voltage Vref. Accordingly, responsive to capacitor Cdc transferring enough of its charge such that its voltage V_Cdc falls below voltage Vref, the active clamp circuit 330 turns off transistors M1 and M2. With transistors M1 and M2 being off, diodes D3 and D4 and the transistors' body diodes D1_M1 and D2_M2 operate as a full-bridge rectifier to provide a current to charge capacitor Cdc.

Responsive to the voltage V_Cdc then increasing above the voltage Vref, the active clamp circuit 330 turns on transistors M1 and M2. With capacitor Cdc being sufficiently charged to directly power the WiFi transceiver 324, current from the capacitor-drop power supply is not needed to charge the capacitor. However, with transistors M1 and M2 being turned on in this state (i.e., capacitor Cdc being sufficiently charged to power the transceiver), a path continues to be available for the AC current to flow as described below. The path for current to flow between terminals T31 and T32 of the light control module 320 depends on (a) whether switch SW2 is on or off and (b) whether the capacitor Cdc is sufficiently charged to power the WiFi transceiver 324.

Rather than a switch being coupled between the terminals of the light control module as was the case for the embodiment of FIG. 1, switch SW2 is coupled in parallel with the series combination of resistor Rs and capacitor Cs as shown in the embodiment of FIG. 3. Switch SW2 is implemented as a solid-state switch (e.g., one or more transistors) which is turned on and off by a signal from driver 322. Driver 322 receives a control signal 326 from the WiFi transceiver 324 and generates a suitable voltage to turn on or off switch SW2.

Responsive to voltage V_Cdc being less than voltage Vref, the active clamp circuit 330 turns off transistors M1 and M2, thereby causing diodes D3, D4, and body diodes D1_M1 and D2_M2 to operate as a full-bridge rectifier. With switch SW2 off, current flows during the half-cycle of the AC voltage in which the voltage on terminal T31 is positive relative to the voltage on terminal T32 as shown by arrows 351. Accordingly, current 351 flows through resistor Rs, capacitor Cs, diode D3, and to capacitor Cdc and to the WiFi transceiver 324. Current 351 continues flowing through body diode D2_M2 and to terminal T32. The dashed arrows 352 show the direction of current flow during the other half-cycle of the AC voltage in which the voltage on terminal T31 is negative relative to the voltage on terminal T32. Other than through capacitor Cdc and the WiFi transceiver 324, the direction of current flow is generally in the opposite direction. Due to the full-bridge rectification afforded by the combination of diodes D3 and D4 and body diodes D1_M1 and D2_M2, current flows in the same direction in both half-cycles through the capacitor Cdc to thereby charge the capacitor.

With switch SW2 on/closed (e.g., as a result of a wireless signal received by the WiFi transceiver 324 to turn on the light source 110), the flow of current (voltage V_Cdc being less than voltage Vref) is largely the same as described above with the exception that current flows through switch SW2 rather than through the series combination of resistor Rs and capacitor Cs of the capacitor-drop power supply 310. Turning on switch SW2 causes a sufficiently large current to flow through the light source 110 to thereby cause the light source 110 to be illuminated. With switch SW2 off, the current draw by the WiFi transceiver 324 is limited by capacitor Cs to a sufficiently low level so as not to cause the light source 110 to illuminate.

Figure 4:
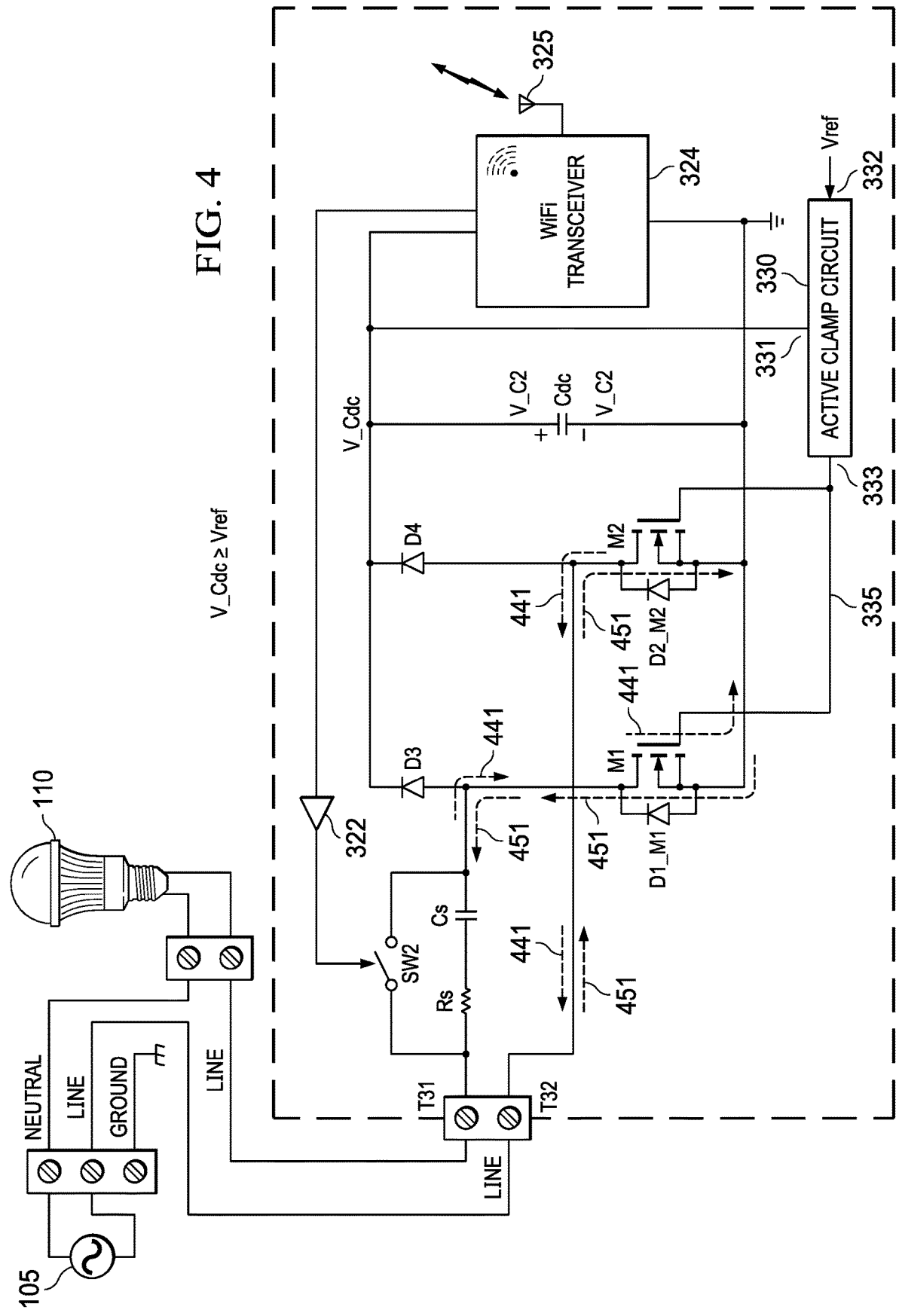
FIG. 4 is the schematic circuit diagram of FIG. 3 illustrating the direction of current flow through the light control module.
Figure 8:
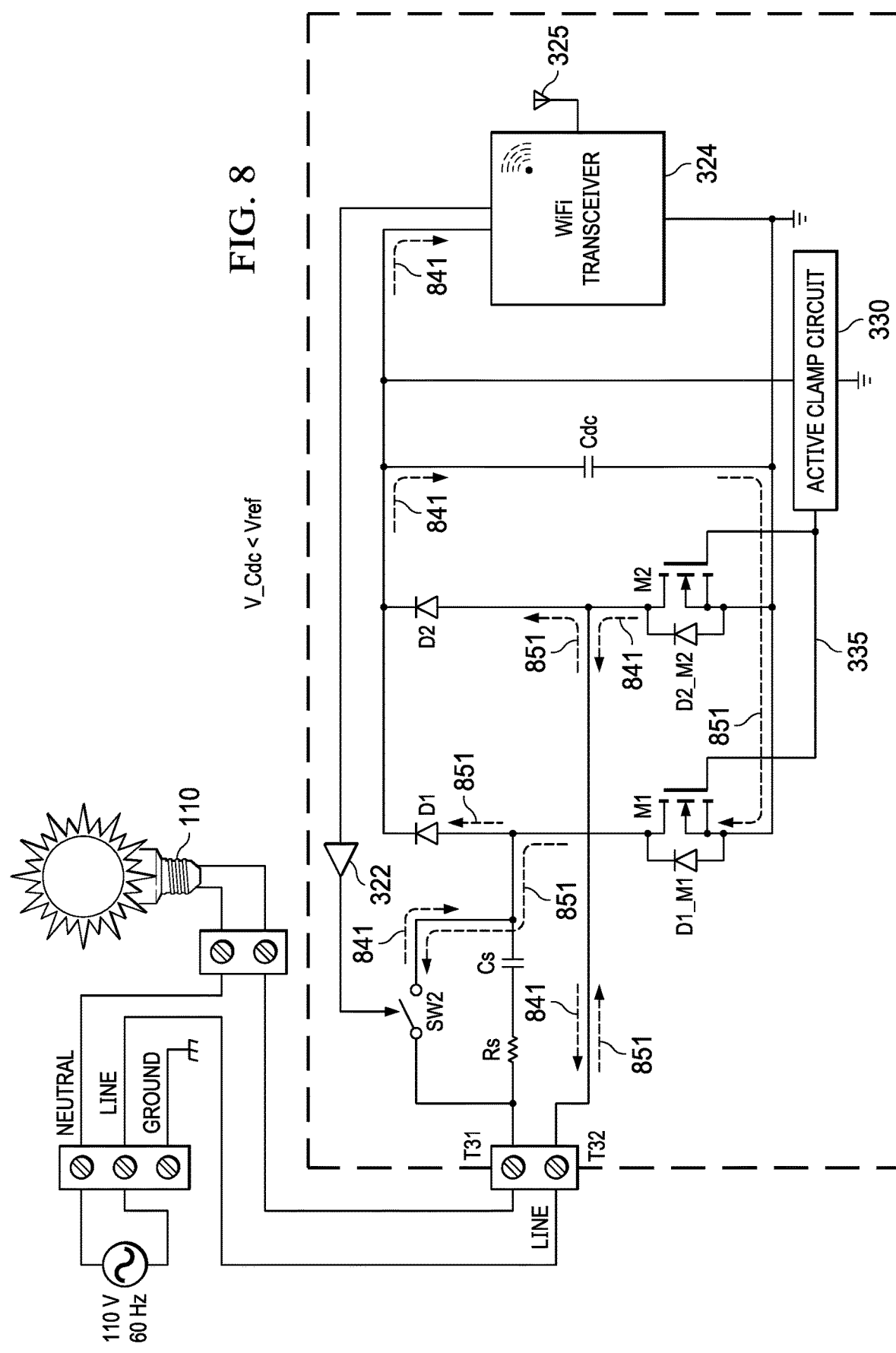
FIGS. 8 and 9 are is a schematic circuit diagrams illustrating the direction of current flow through the light control module of FIG. 3 when a switch within the light control module is closed and a light source is illuminated.
Figure 9:
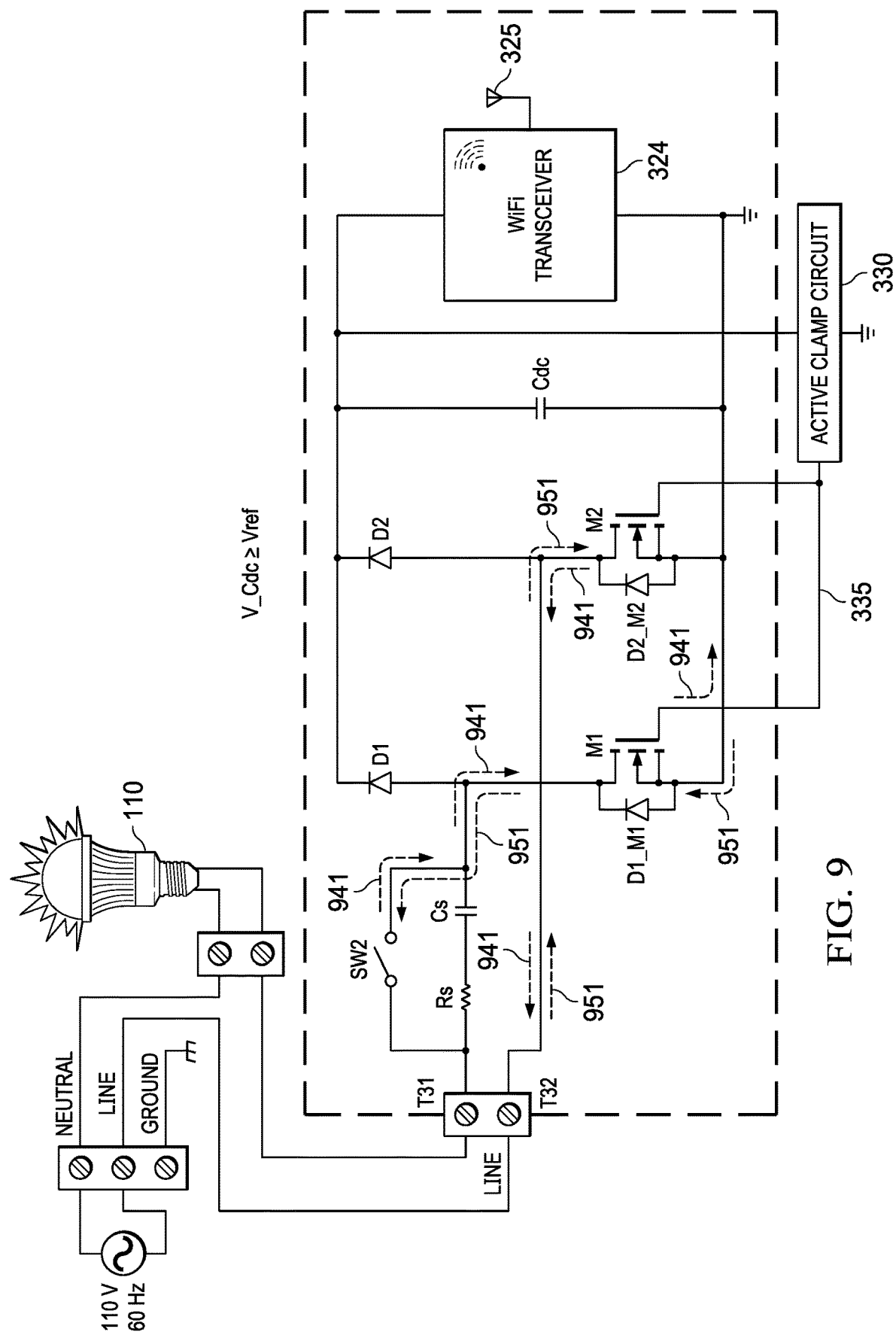

FIG. 4 repeats the same circuit from FIG. 3 but indicates the flow of current when voltage V_Cdc is greater than voltage Vref. In this state, the active clamp circuit asserts its output signal 335 to a voltage level that turns on transistors M1 and M2. During the half-cycle of the AC voltage (T31 voltage greater than T32 voltage), the current 441 flows from terminal T31 through resistor Rs and capacitor Cs (when switch SW2 is off), transistor M1, and transistor M2 to terminal T32. During the half-cycle of the AC voltage (T32 voltage greater than T31 voltage), the current 441 flows in the opposite direction, accordingly, from terminal T32 through transistor M2, transistor M2, and through resistor Rs and capacitor Cs (when switch SW2 is off) to terminal T31. With switch SW2 being on, the direction of current flow is the same with the exception that the current flows through switch SW2 instead of through the series combination of resistor Rs and capacitor Cs. FIGS. 8 and 9 show the direction of current flow when switch SW2 is on.

As described above regarding the embodiment of FIGS. 3 and 4, current flow is continuous. If the voltage V_Cdc is below voltage Vref, the active clamp circuit 330 turns off transistors M1 and M2, and their body diodes (combined with diodes D3 and D4) receive current to produce a rectified current to charge capacitor Cdc. If the voltage V_Cdc is greater than voltage Vref, the active clamp circuit 330 turns on transistors M1 and M2 to provide a continued current path despite capacitor Cdc not needing any charge current.

FIG. 5 illustrates the sinusoidal AC voltage 201 from AC voltage source 105 and that the current 502 through the light source module 320 continues to flow (not discontinuous as in the example of FIG. 2). As a result of continued current flow and at a level that is below (due to capacitor Cs) a threshold at which the light source 110 would be illuminated, the risk of the light source 110 flickering is reduced or eliminated. The capacitor Cdc has sufficient time to be charged to power the WiFi transceiver.

The embodiment of FIGS. 3 and 4 is an example that lacks a battery. A battery may not be necessary in the embodiment of FIGS. 3 and 4 because current can flow to charge the capacitor Cdc even if switch SW2 is on (whereas in the embodiment of FIG. 1, current could not flow to charge capacitor C2 if switch SW1 was on). When on, switch SW2 does not short-circuit terminals T31 and T32 of the light source module 320. In contrast, when on, switch SW1 does short-circuit terminals T1 and T2 of the light source module 120. Some embodiments may include a battery (across capacitor Cdc) to be charged by the capacitor Cdc.

Figure 6:
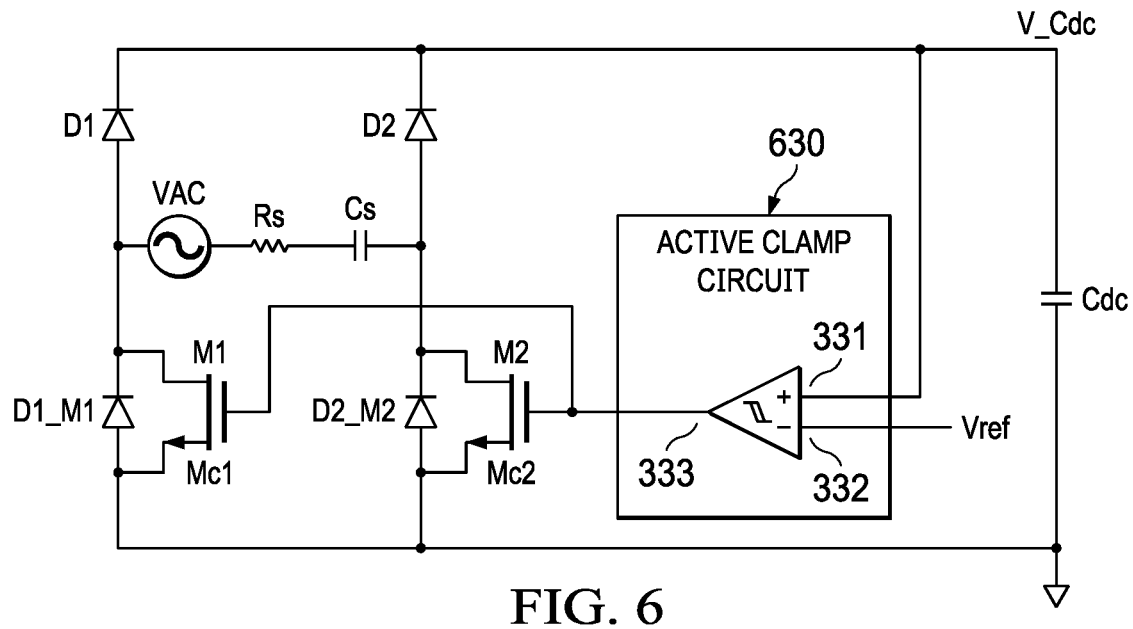
FIG. 6 is a schematic circuit diagram showing one example of an active clamp circuit usable with the light control module of FIG. 3.

FIG. 6 shows an example of an active clamp circuit 630 which implements the active clamp circuit 330 described above. Active clamp circuit 630 includes a comparator 640 that implements hysteresis. The comparator 640 includes a positive (+) input 331 and a negative (−) input 332. The positive input is coupled to the upper terminal of capacitor Cdc and the negative input is coupled to the reference voltage source (Vref). The output 333 of the comparator 640 is coupled to the gates of transistors M1 and M2.

Figure 7:
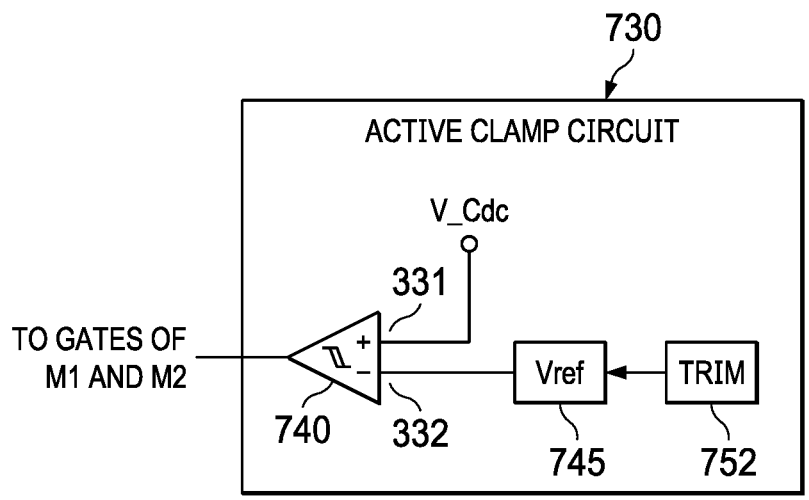
FIG. 7 is a schematic circuit diagram showing another example of an active clamp circuit usable with the light control module of FIG. 3.

FIG. 7 shows an example of an active clamp circuit 730 which implements the active clamp circuit 330 described above. Active clamp circuit 730 includes a comparator 740 that implements hysteresis. A reference voltage source 745 is shown which provides the reference voltage Vref to the negative input 332 of comparator 740. FIG. 7 also shows a trim circuit 752 which is usable to trim the reference voltage source 745.

FIGS. 8 and 9 show the same circuit as in FIG. 3 but indicate the direction of current flow when the light source 110 is illuminated. FIG. 8 shows the direction of current flow when voltage V_Cdc is less than Vref (and transistors M1 and M2 are off). FIG. 9 shows the direction of current flow when voltage V_Cdc is greater than Vref (and transistors M1 and M2 are on). In FIG. 8, arrows 841 (during one half-cycle) show that, from terminal T31, the current flows through switch SW2 and diode D1 to both capacitor Cdc and the WiFi transceiver 324, and then through body diode D1_M1 to terminal T32. During the opposing half-cycle, the current flow 851 is in the opposite direction with the exception that current flows in the same direction through capacitor Cdc and the WiFi transceiver 324 due to the full-bridge rectification provided by the diodes D1 and D2 and the transistors' body diodes D1_M1 and D2_M2.

In FIG. 9, arrows 941 (during one half-cycle) show that, from terminal T31, the current flows through switch SW2 and through transistors M1 and M2 (which are on), and to terminal T32. During the opposing half-cycle, the current flow 951 is in the opposite direction.

Figure 10:
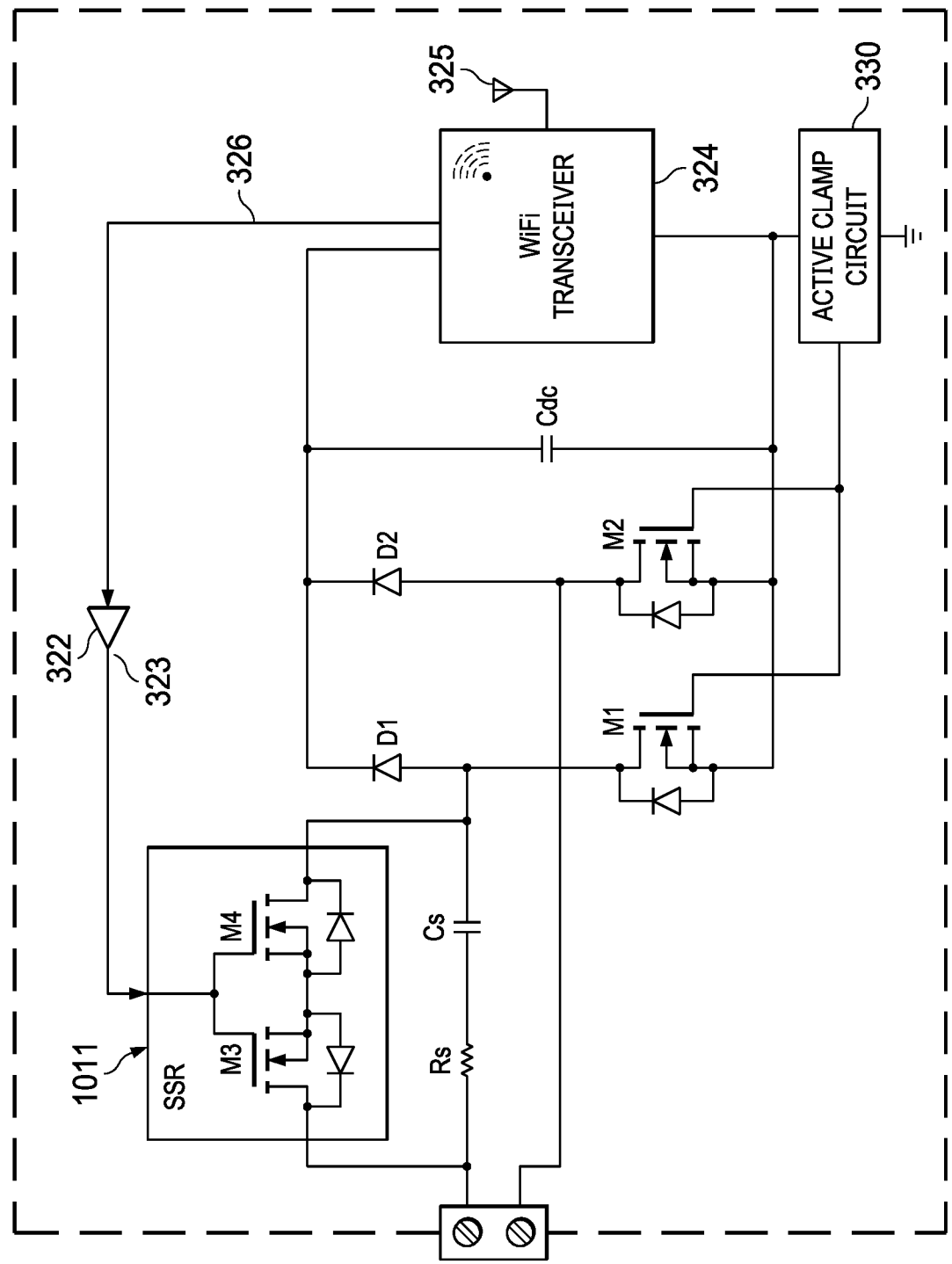
FIG. 10 is a schematic circuit diagram illustrating the switch as a solid-state relay in accordance with an example.

FIG. 10 illustrates an example embodiment in which switch SW2 is implemented as a solid-state relay (SSR) 1011. The SSR 1011 includes transistors M3 and M4 coupled in series. The series combination of transistors M3 and M4 is coupled in parallel with the series combination of resistor Rs and capacitor Cs. Transistors M3 and M4 are MOSFETs in this example and have their sources connected together. The output 3233 of driver 322 is coupled to the gates of transistors M3 and M4. The body diodes D3_M3 and D4_M4 have opposite polarities as shown to reduce or avoid current flowing through the SSR 1011 during either half-cycle of the AC voltage when SSR 1011 is off.

Figure 11:
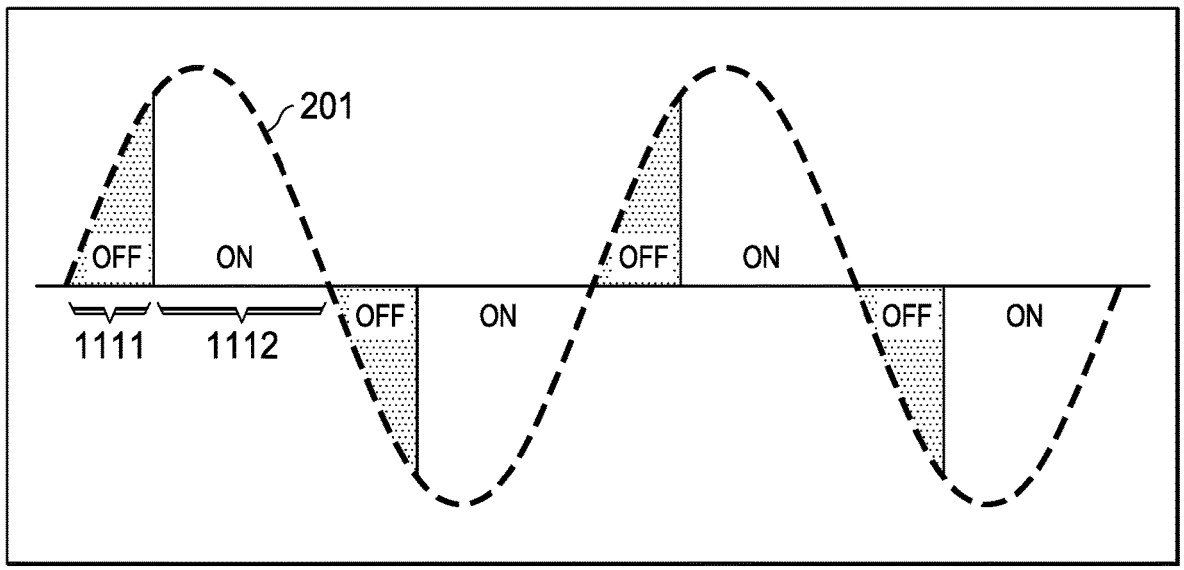
FIGS. 11 and 12 are waveforms illustrating techniques for modulating the on and off states of the switch to implement a dimming function for the light source.
Figure 12:
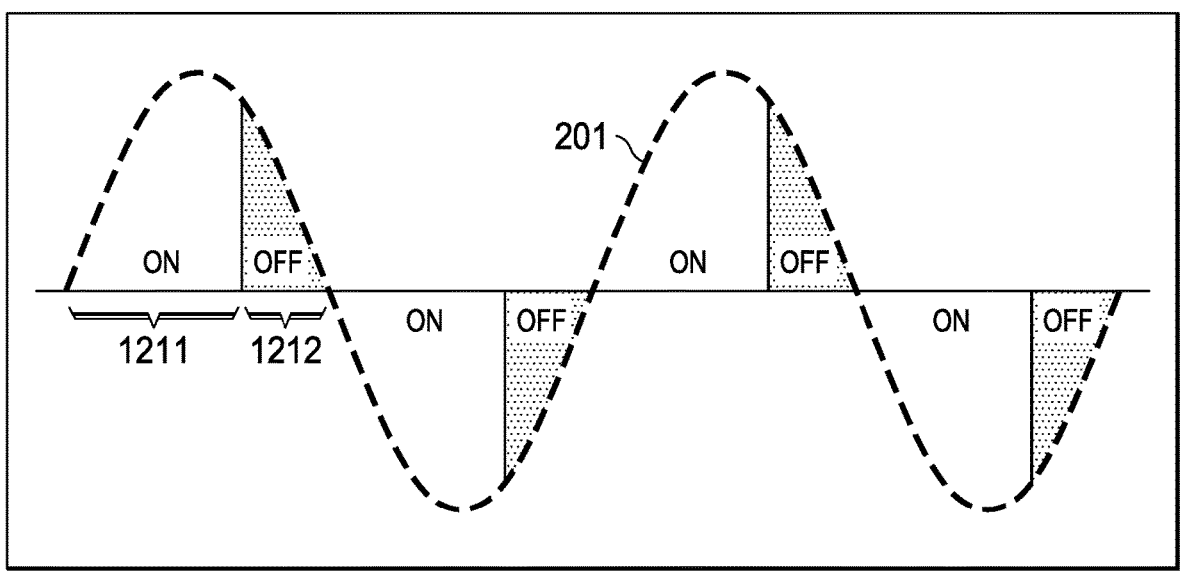

Because switch SW2 is a solid-state switch, its on and off states can be modulated to implement a dimming control of the average amount of light produced by the light source 110. For example, the WiFi transceiver 324 may receive a wireless signal requesting, specifying, or otherwise indicating an increase or decrease of a dimming control. The WiFi transceiver 324 can modulate signal 326 to thereby turn on and off switch SW2 (e.g., SSR 1011) at a desired level. FIG. 11 shows an example of the AC voltage waveform produced by the AC voltage source 105 in which during a first portion 1111 of each half cycle, the switch SW2 is turned off and during a second portion 1112 of each half cycle, the switch SW2 is turned on. FIG. 12 shows an example in which during a first portion 1211 of each half cycle, the switch SW2 is turned on and during a second portion 1212 of each half cycle, the switch SW2 is turned off. The modulation scheme can be different than those shown in FIGS. 11 and 12.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Modifications are possible in the described embodiments, and other embodiments are possible, within the scope of the claims.

What is claimed is:

1. A circuit, comprising:
   a capacitor-drop power supply that includes a series combination of a resistor and a first capacitor, the capacitor-drop power supply including an output, and the capacitor-drop power supply adapted to be coupled to a light source;
   a second capacitor coupled to the output of the capacitor-drop power supply;
   a switch coupled in parallel with the series combination of the resistor and the first capacitor, the switch configured to cause the light source to illuminate; and
   an active clamp circuit coupled to the capacitor-drop power supply, the active clamp circuit having an output coupled to the capacitor-drop power supply, the active clamp circuit configured to cause current to continuously flow through at least one of the switch or the series combination of resistor and first capacitor regardless of a magnitude of the voltage across the second capacitor.

2. The circuit of claim 1, wherein the capacitor-drop power supply further includes:
   a first transistor having a first body diode and a first control input;
   a second transistor having a second body diode and a second control input, the second transistor coupled to the first transistor;
   a third diode coupled to the first transistor; and
   a fourth diode coupled to the second transistor;
   wherein the active clamp circuit's output is coupled to the first and second control inputs.

3. The circuit of claim 2, wherein:
   the active clamp circuit is configured to assert its control signal to a first state responsive to the voltage across the second capacitor being greater than a reference voltage, first and second transistors are configured to be on responsive to the control signal being in the first state;
   the active clamp circuit is configured to assert its control signal to a second state responsive to the voltage across the second capacitor being less than the reference voltage, the first and second transistors are configured to be off responsive to the control signal being in the second state, and responsive to the first and second transistors being off, the first and second body diodes and the third and fourth diodes are configured to operate as a rectifier.

4. The circuit of claim 1, wherein the active clamp circuit includes a comparator.

5. The circuit of claim 1, wherein the active clamp circuit is configured to:
   regardless of whether the switch is on or off, cause the capacitor-drop power supply to charge the second capacitor responsive the voltage across the second capacitor falling below a reference voltage.

6. The circuit of claim 1, wherein the switch includes a solid-state switch.

7. The circuit of claim 1, wherein the switch includes first and second solid-state switches coupled together.

8. The circuit of claim 1, further comprising a wireless transceiver coupled to the output of the capacitor-drop power supply, the wireless transceiver configured to generate an output control signal to toggle the on and off states of the switch, the output control signal having a first state in which the switch is caused to be in the on state and a second state in which the switch is caused to be in the off state.

9. The circuit of claim 8, wherein the wireless transceiver is configured to modulate the on and off states of the switch responsive to receipt of a wireless dimming command for the light source.

10. A circuit, comprising:
a capacitor-drop power supply that includes a series combination of a resistor and a first capacitor, the capacitor-drop power supply including an output, and the capacitor-drop power supply adapted to be coupled to a light source;
a second capacitor coupled to the output of the capacitor-drop power supply;
a switch coupled in parallel with the series combination of the resistor and the first capacitor, the switch configured to cause the light source to illuminate;
an active clamp circuit coupled to the capacitor-drop power supply, the active clamp circuit configured to:
cause the capacitor-drop power supply to operate in a first state responsive to a voltage across the second capacitor being less than a reference voltage, and in the first state, the capacitor-drop power supply provides charging current to the second capacitor; and
cause the capacitor-drop power supply to operate in a second state responsive to a voltage across the second capacitor being greater than the reference voltage, and in the second state, the capacitor-drop power supply provides a current path through at least one of the switch or the series combination of resistor and first capacitor and, while the capacitor-drop power supply is in the second state, the second capacitor does not receive current.

11. The circuit of claim 10, wherein the capacitor-drop power supply includes:
a first transistor and a first control input;
a second transistor and a second control input, the second transistor coupled to the first transistor;
a third diode coupled to the first transistor; and
a fourth diode coupled to the second transistor;
wherein the active clamp circuit's output is coupled to the first and second control inputs.

12. The circuit of claim 11, wherein:
the first transistor has a body diode and the second transistor has a body diode;
the active clamp circuit is configured to generate a control signal in a first state responsive to the voltage across the second capacitor being greater than the reference voltage, and the first and second transistors are configured to be on responsive to the control signal being in the first state;
the active clamp circuit is configured to generate its control signal in a second state responsive to the voltage across the second capacitor being less than the reference voltage, the first and second transistors are configured to be off responsive to the control signal being in the second state, and responsive to the first and second transistors being off, the first and second body diodes and the third and fourth diodes are configured to operate as a full-bridge rectifier.

13. The circuit of claim 10, wherein the active clamp circuit includes a comparator.

14. The circuit of claim 10, wherein the switch includes first and second solid-state switches coupled together in series.

15. The circuit of claim 10, further comprising a transceiver coupled to the output of the capacitor-drop power supply, the transceiver configured to generate an output control signal to toggle the on and off state of the switch, the output control signal having a first state in which the switch is caused to be in the on state and a second state in which the switch is caused to be in the off state.

16. The circuit of claim 15, wherein the transceiver is a wireless transceiver.

17. A circuit, comprising:
a resistor;
a first capacitor coupled in series with the resistor;
a first diode coupled to the first capacitor;
a second diode coupled to the resistor;
a first transistor coupled to the first diode, the first transistor having a control input;
a second transistor coupled to the second diode, the second transistor having a control input;
a second capacitor coupled to the first and second diodes and to the first and second transistors;
a switch having a control input, the switch coupled in parallel with the series coupling of the resistor and the first capacitor;
a comparator having an input and an output, the input coupled to the second capacitor and the output coupled to the control inputs of the first and second transistors; and
a transceiver coupled to the second capacitor, the transceiver having an output coupled to the control input of the switch.

18. The circuit of claim 17, wherein the comparator is configured to assert an output signal on its output to a first state that turns on the first and second switches responsive to a voltage on the second capacitor exceeding a reference voltage.

19. The circuit of claim 18, wherein the comparator is configured to assert the output signal on its output to a second state that turns off the first and second switches responsive to the voltage on the second capacitor being below the reference voltage.

* * * * *